US011533244B1

(12) United States Patent
Bleidorn et al.

(10) Patent No.: US 11,533,244 B1
(45) Date of Patent: Dec. 20, 2022

(54) IDENTIFYING A TETHERED DEVICE USING TCP ERROR TRANSMISSIONS

(71) Applicant: CHARTER COMMUNICATIONS OPERATING, LLC, St. Louis, MO (US)

(72) Inventors: Timothy Bleidorn, Colorado Springs, CO (US); Christopher Teague, Highlands Ranch, CO (US); Janath Kumar Madhamanchi, Littleton, CO (US)

(73) Assignee: CHARTER COMMUNICATIONS OPERATING, LLC.

(*) Notice: Subject to any disclaimer, the term of this patent is extended or adjusted under 35 U.S.C. 154(b) by 0 days.

(21) Appl. No.: 17/380,695

(22) Filed: Jul. 20, 2021

(51) Int. Cl.
*H04L 43/0823* (2022.01)
*H04L 47/11* (2022.01)
*H04W 24/02* (2009.01)
*H04L 69/16* (2022.01)

(52) U.S. Cl.
CPC .......... *H04L 43/0847* (2013.01); *H04L 47/11* (2013.01); *H04L 69/16* (2013.01); *H04W 24/02* (2013.01)

(58) Field of Classification Search
None
See application file for complete search history.

(56) References Cited

U.S. PATENT DOCUMENTS

| 8,943,554 | B2 | 1/2015 | Tran et al. |
| 9,203,755 | B1 | 12/2015 | Wong et al. |
| 10,506,440 | B2 | 12/2019 | Erman et al. |
| 2018/0352057 | A1* | 12/2018 | Li .................... H04L 69/14 |
| 2021/0399854 | A1* | 12/2021 | Outes ............... H04W 72/0453 |

OTHER PUBLICATIONS

"How can phone companies detect tethering (incl. WiFi hotspot)" Android Enthusiasts thread, https://android.stackexchange.com/questions/47819/how-can-phone-companies-detect-tethering-incl-wifi-hotspot.

* cited by examiner

*Primary Examiner* — Walter J Divito
(74) *Attorney, Agent, or Firm* — Meagher Emanuel Laks Goldberg & Liao, LLP

(57) ABSTRACT

Various embodiments comprise systems, methods, mechanisms, and apparatus by which a network operator such as a wireline internet service provider (ISP) may determine that an endpoint device has one or more other wireless devices tethered to it, such as a mobile handset providing dual-Wi-Fi ad-hoc tethering (i.e., connected to a high-speed Wi-Fi network while simultaneously providing Wi-Fi connections to wireless devices tethered to the mobile handset), by monitoring Transmission Control Protocol (TCP)/IP traffic flow associated with endpoint devices (i.e., to or through endpoint devices), characterizing these traffic flows in accordance with one or more error indicative criteria to establish thereby a baseline profile of error indicative criteria that is indicative of a TCP/IP traffic flow associated with an endpoint device that is not associated with tethering (e.g., a rate or number of duplicate ACKs), wherein deviations from the baseline profile of error indicative criteria beyond a threshold are indicative of a TCP/IP traffic flow associated with an endpoint device that is associated with tethering.

21 Claims, 2 Drawing Sheets

IDENTIFYING A TETHERED DEVICE USING TCP ERROR TRANSMISSIONS

FIELD OF THE DISCLOSURE

The present disclosure relates generally to detecting tethering and, more particularly, to a method and apparatus for detecting tethering using TCP re-transmissions.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Modern mobile devices can broadcast an ad-hoc Wi-Fi Service Set Identifier (SSID) that can be used to share the mobile device's internet access with other devices within range. This feature is referred to as a personal hotspot or tethering. Several forms of tethering exit to include wireless tethering—utilizing the Wi-Fi standard hotspot (e.g., 802.11x), and wired tethering—utilizing an adapter to directly connect to the mobile device.

In the past, mobile handsets capable of tethering have allowed connected devices to share the handset's mobile network data connection (e.g., 4G/LTE or 5G). Wireline Internet Service Providers (ISPs) have not been impacted by this since such a data connection does not result in traffic across the wireline ISP's network. That is, the technical limitations of mobile device tethering did not allow for concurrent Wi-Fi connections to be active (one to connect the handset to a highspeed wireline network, and one to allow tethered devices to connect to the handset), thereby limiting the 'sharing' of a mobile handset's internet access to that of the mobile network.

Mobile devices are being introduced that offer dual Wi-Fi radio access technology (RAT) capability providing, thereby, dual-Wi-Fi ad-hoc tethering where the mobile device may be connected to a high-speed Wi-Fi network while simultaneously providing a WiFi hotspot connection to another (tethered) wireless devices. This effectively provides a tethered device access to the high-speed wireline internet service provider (ISP) data network via the Wi-Fi to Wi-Fi link provided by the UE. This presents various problems to a wireline ISP, and must be detected to be managed by the ISP.

SUMMARY

Various deficiencies in the prior art are addressed by systems, methods, mechanisms, and apparatus by which a network operator such as a wireline internet service provider (ISP) may determine that an endpoint device has one or more other wireless devices tethered to it, such as a mobile handset providing dual-Wi-Fi ad-hoc tethering (i.e., connected to a high-speed Wi-Fi network while simultaneously providing Wi-Fi connections to wireless devices tethered to the mobile handset), by monitoring Transmission Control Protocol (TCP)/IP traffic flow associated with endpoint devices (i.e., to or through endpoint devices), characterizing these traffic flows in accordance with one or more error indicative criteria to establish thereby a baseline profile of error indicative criteria that is indicative of a TCP/IP traffic flow associated with an endpoint device that is not associated with tethering (e.g., a rate or number of duplicate ACKs), wherein deviations from the baseline profile of error indicative criteria beyond a threshold are indicative of a TCP/IP traffic flow associated with an endpoint device that is associated with tethering.

A method according to one embodiment for detecting a tethering function being performed by an endpoint device in a communication network comprises: at a network element, monitoring Transmission Control Protocol (TCP)/IP traffic flow associated with an endpoint device and determining for the endpoint device an average baseline value $R_B$ of a rate of occurrence of a TCP/IP error condition for TCP/IP traffic terminating at the endpoint device; at the network device, monitoring a TCP/IP traffic flow of interest received by the endpoint device and determining for the TCP/IP traffic flow of interest a rate of occurrence $R_A$ of the TCP/IP error condition; wherein in response to the rate of occurrence $R_A$ of the TCP/IP error condition being outside of a statistical margin of error of the average baseline value $R_B$ rate of occurrence of the TCP/IP error condition, determining that the TCP/IP traffic flow of interest is associated with a wireless device tethered to the endpoint device.

Additional objects, advantages, and novel features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
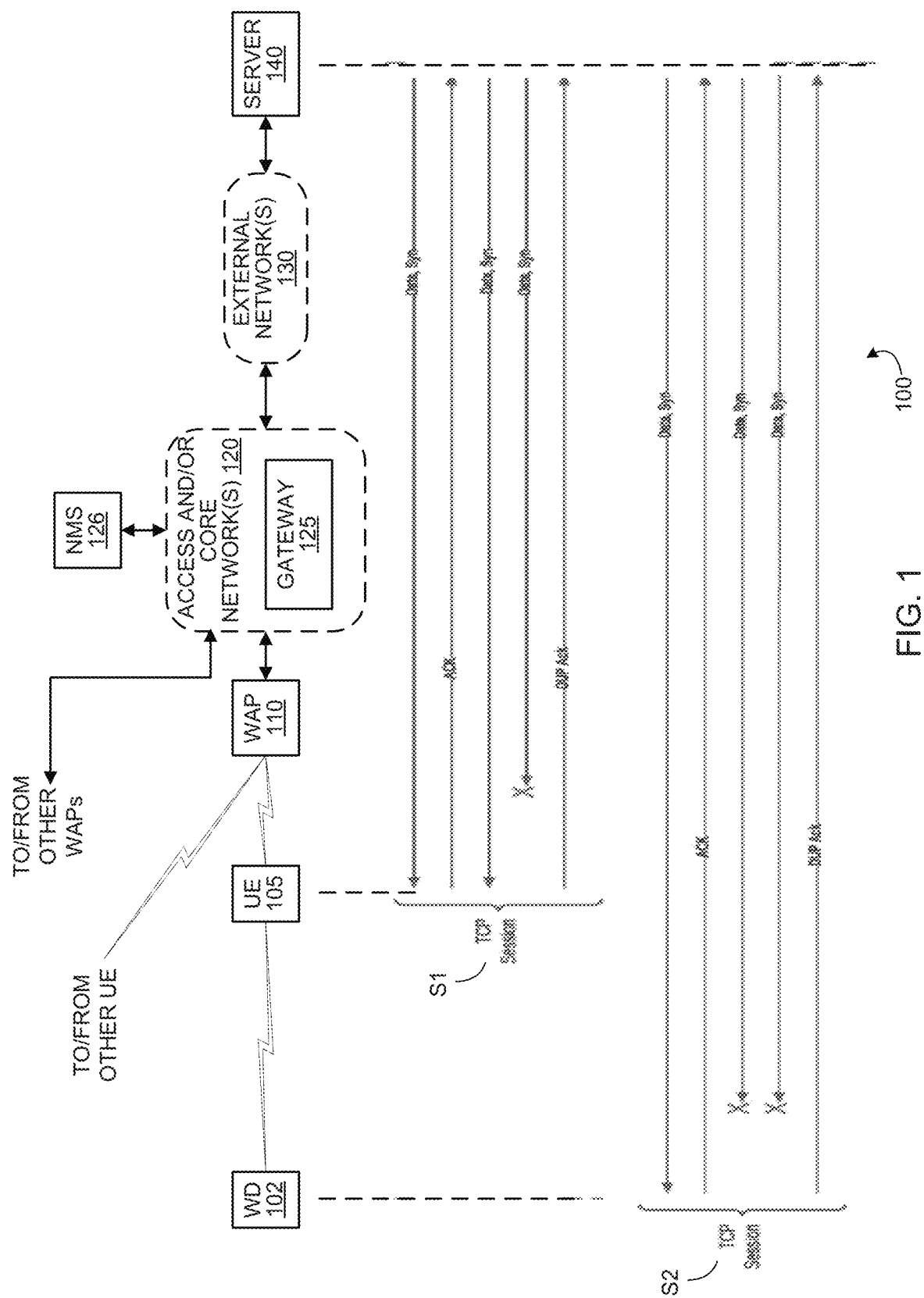
FIG. 1 depicts a high-level block diagram of a network services architecture benefiting from various embodiments.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Various embodiments provide a system, method, mechanism, and apparatus by which a network operator such as a wireline internet service provider (ISP) may determine that an endpoint device has one or more other wireless devices tethered to it, such as a mobile handset providing dual-Wi-Fi ad-hoc tethering (i.e., connected to a high-speed Wi-Fi network while simultaneously providing Wi-Fi connections to wireless devices tethered to the mobile handset).

In particular, various embodiments monitor Transmission Control Protocol (TCP)/IP traffic flow associated with endpoint devices (i.e., to or through endpoint devices), characterize these traffic flows in accordance with one or more error indicative criteria to establish thereby a baseline profile of error indicative criteria that is indicative of a TCP/IP traffic flow associated with an endpoint device that is not associated with tethering (e.g., a rate or number of duplicate ACKs), wherein deviations from the baseline profile of error indicative criteria beyond a threshold amount (e.g., 25% or 50% increase to rate or number of duplicate ACKs), is indicative of a TCP/IP traffic flow associated with an endpoint device that is associated with tethering.

At a transmitter (e.g., a source device such as a remote server) a stream of data to be transmitted (e.g., a file, web page, media stream, etc.) is divided into data stream portions, wherein each portion is stored in a data section of a respective TCP segment, wherein each TCP segment has a header section including a respective sequence number to identify the TCP segment (in case a segment is not received) and to indicate the segment order (regardless of any packet reordering, or packet loss that may occur during transmission) so that the data portions transported by the TCP segments may be combined in the appropriate order at a receiver (e.g., a destination device such as a mobile phone or laptop) for use by whatever application or service is receiving/processing the received stream of data. Acknowledgements (ACKs) are sent with a sequence number by the receiver to inform the transmitter that the data portion associated with the corresponding sequence has been received.

TCP may identify segment loss via retransmission timeout (RTO), wherein transmitted segments that are not acknowledged by the destination device are retransmitted after a defined period of time.

TCP may identify segment loss via duplicate acknowledgements (DupAcks).

Specifically, since the ACKs are cumulative and reflect the highest sequence number successfully received, a failure to receive a particular segment (N) means that in response to receiving the next segment (N+1) the receiver will transmit an ACK with the sequence number of the highest successfully accumulated segment (N−1), which will be a second or duplicate transmission of the ACK with the (N−1) sequence number.

FIG. 1 depicts a high-level block diagram of a network services architecture benefiting from various embodiments. Specifically, FIG. 1 depicts user equipment (UE) 105 in wireless communication with a wireless access point (WAP) 110, the WAP 110 in communication with a gateway 125 associated with access and/or core networks 120, the networks 120 in communication with external networks 130 such as the Internet, an IP Multimedia Core Network Subsystem (IMS), or any other type of external network.

The UE 105 receives network services (e.g., voice, streaming media, data upload/download etc.) via the WAP 110, such as illustratively provided by a remote server 140 coupled to external networks 130 and communication with the gateway 125 of the access and/or core networks 120. It will be appreciated that while only a single example of each of the UE 105, WAP 110, and gateway 125 is depicted in FIG. 1, an actual network services architecture may comprise millions of UE 105 in communication with thousands of WAPs 110 to receive services from access and/or core networks 120 comprising many local and regional network such as provided by a telecommunications, cable television, and/or other network services provider.

The UE 105 may comprise any type of endpoint device configured for use in accordance with the various embodiments, such as a mobile phone, mobile handset, laptop, tablet, and the like. As depicted in FIG. 1, the UE 105 is configured to communicate via at least one WiFi radio access technology (RAT) such as 802.11xx (e.g., 802.11b, 802.11a, 802.11g, 802.11n, 802.11ac, 802.11ax and so on). Further, the UE 105 is configured to communicate with a WAP 110 via a first wireless interface while providing WiFi hotspot services via a second wireless interface. In various embodiments, the UE 105 is further configured to communicate via at least one mobile network (MN) RAT such as 3G, 4G/LTE, and/or 5G.

The WAP 110 may comprise an 802.11xx wireless access point at a home, business or other location configured to communicate with UE 105 and with the access and/or core networks 120. In various embodiments, the WAP 110 and access/core networks 120 are part of a fixed wireline access network (FWAN) operating as an ISP, wherein subscribers associated with UE 105 pay to receive network services in accordance with a service level agreement (SLA) with the network services provider.

The access network 120 may comprise any type of access network, such as a wireless or wireline network associated with an Internet service provider (ISP) or other network services provider.

As depicted in FIG. 1, the gateway 125 handles user data or data plane (DP) functions, such as transporting internet protocol (IP) data traffic (i.e., incoming and outgoing IP packets) between the User Equipment (UE) 105 (via a WAP 110) and the external networks 130, handling control plane signaling, performing various functions such as IP address/IP prefix allocation, policy control and charging, and/or other functions.

In various embodiments, a network management system (NMS) 126 cooperates with the gateway 125 and/or other elements within the networks 122 perform various network management functions, such as network optimization, congestion monitoring, session monitoring, and so on as is known. The NMS 126 may include a database that contains user-related and subscriber-related information, and provides support functions in mobility management, call and session setup, user authentication, access authorization, and other functions. In various embodiments, the NMS 126 and, optionally, other provider equipment (PE) management entities are configured to store subscription/service level agreement (SLA) data associated with many subscribers to an ISP or converged network (providing services via multiple RATs).

In various embodiments, the NMS 126, gateway 125, and/or other provider equipment (PE) may monitor the TCP/IP traffic flows associated with endpoint devices. Transmission errors associated with the monitored traffic flows to one or more applications or services operative at the endpoint device are characterized in accordance with one or more error indicative criteria to establish thereby a baseline transmission profile.

When monitored traffic flows to the one or more applications or services operative at an endpoint device exhibit transmission errors substantially in accordance with the baseline transmission error profile, the endpoint device is deemed to not be tethering.

When monitored traffic flows to the one or more applications or services operative at an endpoint device exhibit transmission errors exceeding by a threshold amount the baseline transmission error profile, the endpoint device is deemed to tethering.

The baseline error transmission profile may be constructed and used for each endpoint device on a per-application basis, an application type basis, a data type basis, a time of day basis, and/or any combination of these and other useful basis. Further, the baseline error transmission profile may be updated periodically or continually. Further, the baseline error transmission profile may be adapted in response to contemporaneous network conditions, such as congestion levels, buffer utilization levels, equipment availability/maintenance, link availability/maintenance, and other dynamic or static conditions capable of affecting transmission error rates.

The error indicative criteria may include DupACKs, RTOs, and other transmission error-indicative information.

Generally speaking, UE 105 comprise subscriber devices capable of received network services such as voice, data, streaming media and the like via any of a plurality of RAT nodes, wherein the amount and/or type of services to be received is defined in accordance with the subscriber SLA.

As depicted in FIG. 1, a wireless device (WD) 102 (e.g., a laptop computer, mobile phone, wireless set top box, smart speaker, or other wireless device) is tethered to UE 105 and connected thereby to, ultimately, the server 104, which operates as an endpoint server for services received by WD 102.

As graphically depicted in FIG. 1, a first TCP session S1 between UE 105 and server 140 includes multiple connection initiations with data transmissions (data, SYN) from the server 140 to the UE 105 (e.g., a numbered sequence of data segments/packets such as for a web page, media stream, and so on), and corresponding acknowledgement ACK transmissions from the UE 105 to the server 140. In the case of the UE 105 receiving out of order segments/packets as indicated by the sequence numbers of received segments/packets (indicative of lost/dropped data segments/packets), the UE 105 will send a duplicate ACK to indicate this condition, and the server 140 will begin transmitting segments/packets from that of the last acknowledged sequence number. The graphical indication of a single "X" is intended to reflect a first rate of segment/packet loss, which corresponds to a first rate of duplicate ACK transmission by the UE 105.

As graphically depicted in FIG. 1, a second TCP session S2 between WD 102 and server 140 similarly includes multiple connection initiations with data transmissions (data, SYN) from the server 140 to the WD 102, and corresponding acknowledgement ACK transmissions from the WD 102 to the server 140. In the case of the WD 102 receiving out of order segments/packets as indicated by the sequence numbers of received segments/packets (indicative of lost/dropped segments/packets), the WD 102 will send a duplicate ACK to indicate this condition, and the server 140 will begin transmitting segments/packets from that of the last acknowledged sequence number. The graphical indication of a first and a second "X" is intended to reflect a second rate of segment/packet loss, which will correspond with a second rate of duplicate ACK transmission, where the second rate of segment/packet loss (and DupACK transmission) is greater than the first.

The NMS 126, gateway, and/or other provider equipment (PE) function as a monitoring entity operating to identify traffic flows associated with at least some of the endpoints (e.g., UE 105) coupled to at least some of the WAPs 110 or other access points in the ISP network, construct/update baseline transmission profiles, and compare traffic flow error indicia to one or more corresponding baseline transmission profiles to determine if a traffic flow is indicative of tethering or not. In various embodiments, the monitoring entity only monitors traffic flows associated with endpoints having a dual-Wi-Fi ad-hoc tethering capability. The various functions discussed herein with respect to the monitoring entity may be distributed across one or more actual or instantiated PE entities such as servers, routers, switches, controllers, network managers, elements managers, and special purpose devices within or associated with the relevant network operator or ISP.

Various elements or portions thereof depicted in FIG. 1 and having functions described herein are implemented at least in part as computing devices having communications capabilities, including for example UE 105, WDs 102, WAPs 110, gateway 125, NMS 126, remote server 140, and/or various portions or elements thereof, as well as various portions of the access and/or core networks 120 and external networks 130. These elements or portions thereof are implemented or instantiated via computing devices of various types, though generally a processor element (e.g., a central processing unit (CPU) or other suitable processor(s)), a memory (e.g., random access memory (RAM), read only memory (ROM), and the like), various communications interfaces (e.g., more interfaces enabling communications via different networks/RATs), input/output interfaces (e.g., GUI delivery mechanism, user input reception mechanism, web portal interacting with remote workstations and so on) and the like.

As such, the various functions depicted and described herein may be implemented at the elements or portions thereof as hardware or a combination of software and hardware, such as by using a general purpose computer, one or more application specific integrated circuits (ASIC), or any other hardware equivalents or combinations thereof. In various embodiments, computer instructions associated with a function of an element or portion thereof are loaded into a respective memory and executed by a respective processor to implement the respective functions as discussed herein. Thus various functions, elements and/or modules described herein, or portions thereof, may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

Figure 2:
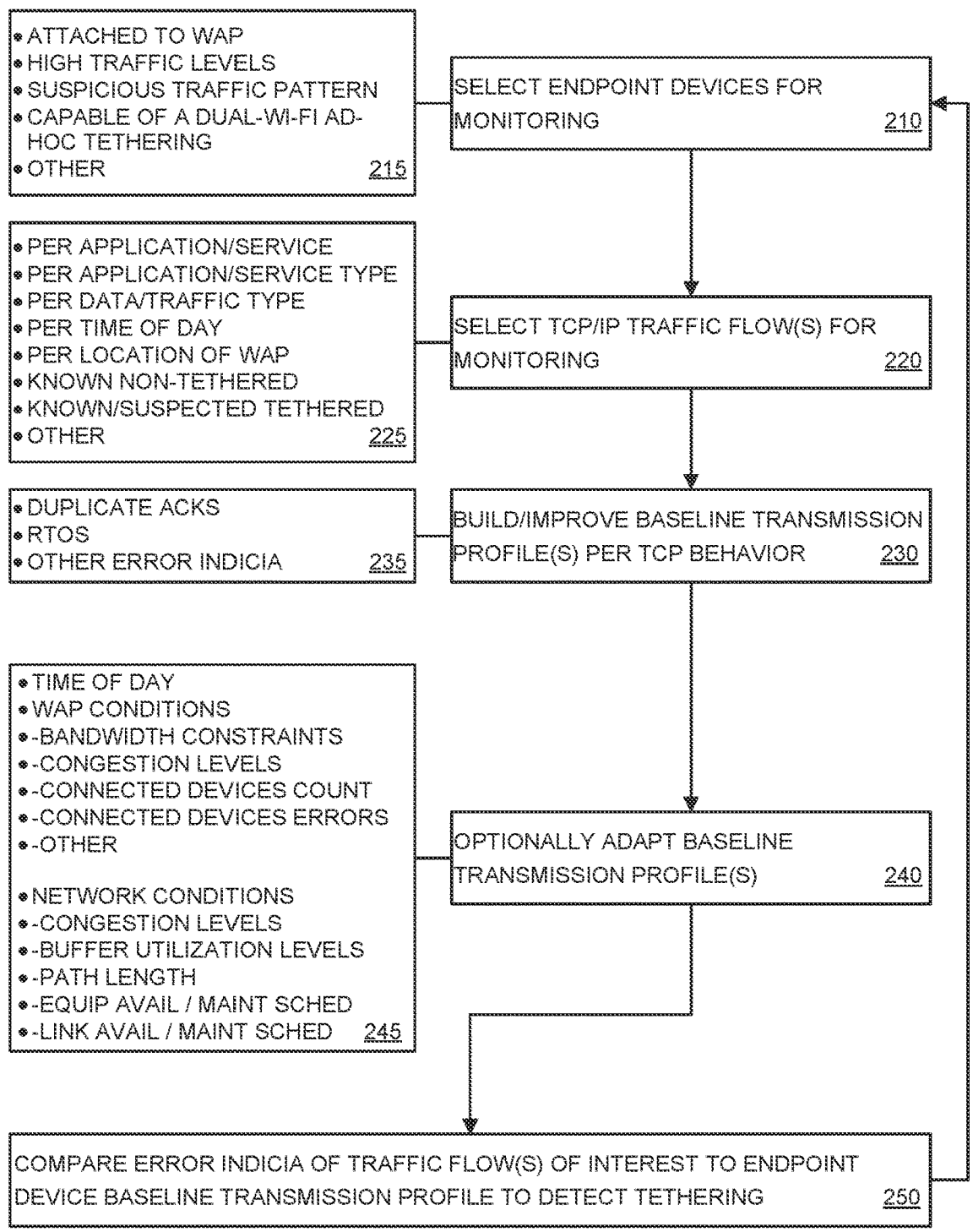
FIG. 2 depicts a flow diagram of a method according to various embodiments.

FIG. 2 depicts a flow diagram of a method according to an embodiment. Specifically, FIG. 2 depicts a method 200 by which provider equipment (PE) may identify TCP/IP traffic patterns indicative of tethered operation at endpoint devices.

At step 210, one or endpoint devices are selected for monitoring to identify whether they are supporting other wireless devices tethered thereto. Referring to box 215, the selected endpoint devices may comprise UE 105 or other wireless devices attached to and/or communicating with one or more wireless access points (WAPs) of interest, associated with high to unusually high traffic levels and/or suspicious traffic patterns (e.g., traffic patterns potentially indicative of tethering such as unusual device-specific or subscriber-specific session statistics, endpoint incompatible traffic or data, etc.), actually capable of functioning as a dual WiFi ad-hoc tethering device, and/or meeting other criteria.

At step 220, one or more TCP/IP traffic flows are selected for monitoring. For example, one or more of the TCP/IP traffic flows associated with each of the selected endpoint devices may be selected for monitoring and further processing in accordance with the various embodiments. Referring to box 225, the traffic flow selection criteria may be based upon endpoint related criteria and/or traffic flow related criteria, such as the applications or services associated with the endpoints/traffic flows, the types of applications or services, specific types of data or traffic (e.g., streaming media, FTP transfer, low bit rate traffic, high bit rate traffic, specific Quality of service (QoS) levels), the particular time of day, the location of one or WAPs, whether the traffic flow or endpoint device is not known or suspected to be associated with a tethered device, whether the traffic flow or endpoint device is known or suspected to be associated with a tethered device, and/or other criteria.

At step 230, baseline transmission profiles of the selected TCP/IP traffic flows are built or improved upon. Referring to box 235, the baseline transmission profiles utilize error indicia such as duplicate ACKs, RTOs, and other error indicia associated with the monitored TCP/IP traffic flows.

As an example, first TCP session S1 posits TCP/IP data transmission from the remote server 140 to UE 105, which TCP/IP data transmission results in the generation of duplicate ACK messages. In particular, an average number of DupACKs is generated per arbitrary time interval (e.g., one second, five seconds, 10 seconds and so on), such that a metric denoted herein as a duplicate ACKs per second value (i.e., retransmission average of the TCP/IP flow) $R_A$ may be calculated as follows:

$$\frac{\text{Counted } Dup \ ACK \text{ (single Flow)}}{\text{time } (t) \text{ in seconds}} = R_A$$

Thus TCP/IP traffic flows may be determined with respect to a particular TCP/IP traffic flow. Generally speaking, the respective retransmission average $R_A$ value may be calculated for each of the TCP/IP traffic flows associated with a particular endpoint, or particular application or service instantiated at the endpoint, or particular data or application control flows associated with a plurality of TCP/IP traffic flows supporting a particular application or service instantiated at the endpoint.

An endpoint device may be associated with multiple TCP/IP traffic flows such as associated with differing applications or services instantiated therein, and a retransmission average $R_A$ value may be similarly be determined with respect to each of these multiple TCP/IP traffic flows formally aggregated traffic flow of a particular endpoint device. In addition, some TCP/IP traffic flows comprise a plurality of TCP/IP traffic flows, or may be defined in term of sets or subsets of TCP/IP traffic flows based, such as based on known destinations.

Confirmed Baseline Transmission Profile

Of particular interest, some TCP/IP traffic flows may be dependably asserted as only belonging to an endpoint device, and not belonging to any wireless device potentially tethered thereto. Mobile device registration messaging may be controlled by a mobile network carrier such as by directing specific TCP/IP traffic flows to applications/services pre-installed or embedded in the firmware of a mobile phone.

Thus, some embodiments of the invention determine a baseline transmission profile associated with a particular endpoint device using only TCP/IP traffic flows that are confirmed, controlled, or otherwise known to belong to the particular endpoint device. Such confirmation or control may be asserted via operator installed software for this purpose, via modifications of existing operator installed software to accomplish this purpose and so on.

In these embodiments, a baseline transmission profile may include an aggregate or average baseline value $R_B$ which is determined as an aggregate or average of the retransmission averages $R_A$ determined for each of the TCP/IP traffic flows known to belong to the particular endpoint device. It is noted that different average baseline values $R_B$ may be used, such as with respect to different applications/services, different types of data, and so on.

Constructed Baseline Transmission Profile

Some embodiments of the invention determine a baseline transmission profile associated with a particular endpoint device using at least some TCP/IP traffic flows that are not confirmed, controlled, or otherwise known to belong to the particular endpoint device.

In these embodiments, a baseline transmission profile may include an aggregate or average baseline value $R_B$ which is determined as an aggregate or average of the retransmission averages $R_A$ determined for some or all of the TCP/IP traffic flows associated with a particular endpoint device, where the TCP/IP traffic flows may include those known to belong to the particular endpoint device as well as those which may or may not belong to the particular endpoint device.

At step 240, the built or improved upon baseline transmission profiles of the selected TCP/IP traffic flows are optionally adapted in response to various conditions. That is, if the conditions under which baseline transmission profiles were originally built or improved upon are no different, then the baseline transmission profiles may be optionally adapted to the change in conditions. Referring to box 245, changed conditions may include differing times of day, differing days of the week, different WAP conditions, differing network conditions, and/or other conditions alone or in combination. WAP conditions may include WAP bandwidth constraints, WAP congestion levels, a number of devices connected to a WAP, a number of errors and/or a type of errors associated with devices connected to a WAP, and so on. Network conditions may include network congestion levels, network interface buffer utilization levels, differing path length or number of hops, equipment availability or related maintenance scheduling, link availability or related maintenance scheduling, and so on.

At step 250, error indicia associated with one or more TCP/IP traffic flows of interest is compared to a baseline transmission profile of the relevant endpoint device to detect whether the TCP/IP traffic flows are associated with a wireless device tethered to the endpoint device.

For example, whether confirmed, constructed, or some combination of being confirmed and constructed, the determined average baseline value $R_B$ associated with an endpoint device is compared to the retransmission average $R_A$ determined for a TCP/IP traffic flow of interest at the endpoint device.

If the TCP/IP traffic flow exhibits an $R_A$ value lower than the determined average baseline value $R_B$ associated with the endpoint device, then it is highly likely that the TCP/IP traffic flow of interest belongs to the endpoint device and not a wireless device tethered thereto. In this scenario, the retransmission average $R_A$ determined for the TCP/IP traffic flow of interest may be incorporated into the determined average baseline value $R_B$ associated with the endpoint device.

If the TCP/IP traffic flow exhibits an $R_A$ value within a statistical margin of error (e.g., 50%, 20%, 1 standard deviation, etc.) of the determined average baseline value $R_B$ associated with the endpoint device, then it is likely that the TCP/IP traffic flow of interest belongs to the endpoint device and not a wireless device tethered thereto. In this scenario, the retransmission average $R_A$ determined for the TCP/IP traffic flow of interest may be incorporated into the determined average baseline value $R_B$ associated with the endpoint device.

If the TCP/IP traffic flow exhibits an $R_A$ value higher than the statistical margin of error of the determined average baseline value $R_B$ associated with the endpoint device, then it is likely that the TCP/IP traffic flow of interest belongs to a wireless device tethered to the endpoint device. In this scenario, the retransmission average $R_A$ determined for the TCP/IP traffic flow of interest may not be incorporated into the determined average baseline value $R_B$ associated with the endpoint device.

Further, since it is likely that unwanted (from the network operator or ISP perspective) delivery of network services to a tethered wireless device is occurring, the network operator or ISP may affirmatively take steps to terminate or throttle suspect TCP/IP traffic flows, to offer the endpoint device an opportunity to upgrade their service level agreement (SLA), to impose additional costs upon the subscriber associated with the endpoint device and so on.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative").

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. A method for detecting a tethering function being performed by an endpoint device in a communication network, the method comprising:
    at a network element, monitoring Transmission Control Protocol (TCP)/IP traffic flow associated with an endpoint device and determining for the endpoint device an average baseline value $R_B$ of a rate of occurrence of a TCP/IP error condition for TCP/IP traffic terminating at the endpoint device;
    at the network device, monitoring a TCP/IP traffic flow of interest received by the endpoint device and determining for the TCP/IP traffic flow of interest a rate of occurrence $R_A$ of the TCP/IP error condition; wherein
    in response to the rate of occurrence $R_A$ of the TCP/IP error condition being outside of a statistical margin of error of the average baseline value $R_B$ rate of occurrence of the TCP/IP error condition, determining that the TCP/IP traffic flow of interest is associated with a wireless device tethered to the endpoint device.

2. The method of claim 1, wherein the TCP/IP error condition comprises a transmission by the endpoint device of a duplicate ACK.

3. The method of claim 1, wherein the average baseline value $R_B$ of a rate of occurrence of a TCP/IP error condition for TCP/IP traffic terminating at the endpoint device is determined by averaging the rate of occurrence $R_A$ of the TCP/IP error condition for each of a plurality of TCP/IP traffic flows received by the endpoint device.

4. The method of claim 3, wherein each of the TCP/IP traffic flows used to determine the average baseline value $R_B$ of a rate of occurrence of a TCP/IP error condition comprises a TCP/IP traffic flow associated with a predefined application instantiated at the endpoint device.

5. The method of claim 4, wherein the predefined application instantiated at the endpoint device comprises an application pre-loaded onto the endpoint device by a network operator.

6. The method of claim 3, wherein at least some of the TCP/IP traffic flows used to determine the average baseline value $R_B$ of a rate of occurrence of a TCP/IP error condition comprise TCP/IP traffic flows of interest having a rate of occurrence $R_A$ of the TCP/IP error condition within the statistical margin of error of the average baseline value $R_B$ rate of occurrence of the TCP/IP error condition.

7. The method of claim 1, further comprising adapting the average baseline value $R_B$ of a rate of occurrence of a TCP/IP error condition in response to an application or service associated with the PC IP traffic flow of interest.

8. The method of claim 1, further comprising adapting the average baseline value $R_B$ of a rate of occurrence of a TCP/IP error condition in response to conditions associated with a wireless access point (WAP) in communication with the endpoint device.

9. The method of claim 8, wherein the conditions associated with the WAP comprise one or more of a time of day, WAP bandwidth constraints, WAP congestion level, and WAP connected device count.

10. The method of claim 1, further comprising adapting the average baseline value $R_B$ of a rate of occurrence of a TCP/IP error condition in response to conditions associated with at least a portion of the communication network in communication with the endpoint device.

11. The method of claim 10, wherein the conditions associated with at least a portion of the communication network comprise one or more of a time of day, network congestion levels, and network buffer utilization level.

12. The method of claim 10, wherein the conditions associated with at least a portion of the communication network comprise one or more of network path length, network equipment availability, and network link availability.

13. The method of claim 1, wherein the TCP/IP traffic flow of interest is selected in accordance with at least one of a corresponding application type, a corresponding data type, and a corresponding traffic type.

14. The method of claim 1, wherein the TCP/IP traffic flow of interest is selected in accordance with at least one of a corresponding WAP of interest, and a corresponding endpoint device of interest.

15. The method of claim 2, wherein the TCP/IP error condition further comprises a retransmission timeout (RTO) condition.

16. The method of claim 1, wherein the network element comprises provider equipment (PE) within the communications network.

17. The method of claim 16, wherein the PE comprises one or more of a network manager, a gateway, and a WAP.

18. The method of claim 1, wherein the method is performed for each of a plurality of endpoint devices capable of tethering and exhibiting a high traffic level.

19. An apparatus in a provider network configured for monitoring TCP/IP traffic flows associated with endpoint devices, the apparatus comprising a processor for executing instructions stored in a tangible and non-transitory computer readable medium to detect a tethering function being performed by an endpoint device in a communication network, the method comprising:
  determining for an endpoint device, an average baseline value $R_B$ of a rate of occurrence of a TCP/IP error condition for TCP/IP traffic terminating at the endpoint device;
  determining, for a TCP/IP traffic flow of interest received by the endpoint device, a rate of occurrence $R_A$ of the TCP/IP error condition; and
  in response to the rate of occurrence $R_A$ of the TCP/IP error condition being outside of a statistical margin of error of the average baseline value $R_B$ rate of occurrence of the TCP/IP error condition, determining that the TCP/IP traffic flow of interest is associated with a wireless device tethered to the endpoint device.

20. The apparatus of claim 19, wherein the apparatus comprises a network manager, a gateway, or a wireless access point (WAP).

21. A computer implemented method of detecting a tethering function being performed by an endpoint device in a communication network, the method comprising:
  at a network element, monitoring Transmission Control Protocol (TCP)/IP traffic flow associated with an endpoint device and determining for the endpoint device an average baseline value $R_B$ of a rate of occurrence of a TCP/IP error condition for TCP/IP traffic terminating at the endpoint device;
  at the network device, monitoring a TCP/IP traffic flow of interest received by the endpoint device and determining for the TCP/IP traffic flow of interest a rate of occurrence $R_A$ of the TCP/IP error condition; wherein
  in response to the rate of occurrence $R_A$ of the TCP/IP error condition being outside of a statistical margin of error of the average baseline value $R_B$ rate of occurrence of the TCP/IP error condition, determining that the TCP/IP traffic flow of interest is associated with a wireless device tethered to the endpoint device.

* * * * *